US010909368B2

(12) United States Patent
Guo et al.

(10) Patent No.: US 10,909,368 B2
(45) Date of Patent: Feb. 2, 2021

(54) CROP TYPE CLASSIFICATION IN IMAGES

(71) Applicant: X Development LLC, Mountain View, CA (US)

(72) Inventors: Cheng-en Guo, Santa Clara, CA (US); Jie Yang, Sunnyvale, CA (US); Elliott Grant, Woodside, CA (US)

(73) Assignee: X Development LLC, Mountain View, CA (US)

( * ) Notice: Subject to any disclaimer, the term of this patent is extended or adjusted under 35 U.S.C. 154(b) by 126 days.

(21) Appl. No.: 16/218,305

(22) Filed: Dec. 12, 2018

(65) Prior Publication Data
US 2019/0228224 A1 Jul. 25, 2019

Related U.S. Application Data

(60) Provisional application No. 62/620,939, filed on Jan. 23, 2018.

(51) Int. Cl.
G06K 9/00 (2006.01)
G06N 7/00 (2006.01)
(Continued)

(52) U.S. Cl.
CPC ....... G06K 9/00657 (2013.01); G06K 9/0063 (2013.01); G06K 9/40 (2013.01); G06K 9/4628 (2013.01); G06K 9/6274 (2013.01); G06N 3/08 (2013.01); G06N 7/005 (2013.01); G06N 20/20 (2019.01); G06T 7/174 (2017.01); G06Q 50/02 (2013.01); G06T 2207/10032 (2013.01)

(58) Field of Classification Search
CPC .......... G06N 20/20; G06N 3/08; G06N 7/005; G06K 9/0063; G06K 9/40; G06K 9/4628; G06K 9/6274
See application file for complete search history.

(56) References Cited

U.S. PATENT DOCUMENTS 7,916,898 B2  3/2011 Anderson
9,152,938 B2  10/2015 Lang et al.
(Continued)

OTHER PUBLICATIONS

International Search Report and Written Opinion from the International Searching Authority dated Mar. 25, 2019 for International Application No. PCT/US19/13704, filed Jan. 15, 2019, 11 pages.
(Continued)

Primary Examiner — Edward Park
(74) Attorney, Agent, or Firm — Christensen O'Connor Johnson Kindness PLLC

(57) ABSTRACT

In embodiments, obtaining a plurality of image sets associated with a geographical region and a time period, wherein each image set of the plurality of image sets comprises multi-spectral and time series images that depict a respective particular portion of the geographical region during the time period, and predicting one or more crop types growing in each of particular locations within the particular portion of the geographical region associated with an image set of the plurality of image sets. Determining a crop type classification for each of the particular locations based on the predicted one or more crop types for the respective particular locations, and generating a crop indicative image comprising at least one image of the multi-spectral and time series images of the image set overlaid with indications of the crop type classification determined for the respective particular locations.

22 Claims, 7 Drawing Sheets

(51) Int. Cl.
*G06N 3/08* (2006.01)
*G06N 20/20* (2019.01)
*G06T 7/174* (2017.01)
*G06K 9/46* (2006.01)
*G06K 9/40* (2006.01)
*G06K 9/62* (2006.01)
*G06Q 50/02* (2012.01)

(56) References Cited

U.S. PATENT DOCUMENTS

| | | |
|---|---|---|
| 9,256,907 B2 | 2/2016 | Macy |
| 9,619,734 B2 | 4/2017 | Marchisio et al. |
| 2006/0287896 A1 | 12/2006 | McComb et al. |
| 2007/0036467 A1 | 2/2007 | Coleman et al. |
| 2014/0172754 A1 | 6/2014 | He et al. |
| 2016/0247082 A1 | 7/2016 | Stehling et al. |
| 2017/0161560 A1 | 6/2017 | Itzhaky et al. |
| 2017/0213109 A1 | 7/2017 | Moody et al. |

OTHER PUBLICATIONS

Wardlow et al., "Analysis of time-series MODIS 250 m vegetation index data for crop classification in the U.S. Central Great Plains," Remote Sensing of Environment, 108:3, Jun. 15, 2007, 22 pages.

CROP TYPE CLASSIFICATION IN IMAGES

CROSS-REFERENCE TO RELATED APPLICATIONS

The present application claims priority to U.S. Provisional Patent Application No. 62/620,939 filed Jan. 23, 2018, the disclosure of which is incorporated herein by reference in its entirety.

TECHNICAL FIELD

This disclosure relates generally to image feature detection, and in particular but not exclusively, relates to use of machine learning in image feature detection.

BACKGROUND INFORMATION

Approximately 11% of earth's land surface is presently used in crop production. Despite the importance of agriculture for human survival, environmental impact, national implications, commercial enterprises, the markets, and the like, there is no consistent, reliable, and/or precise knowledge of what crops are grown within a geographical region, county, state, country, continent, planet wide, or portions of any of the above. If more information about agricultural fields were known, seed and fertilizer companies, for example, may better determine available markets for their products in different geographical regions; crop insurance companies may more accurately and cost-effectively assess premiums; banks may more accurately provide farm loans; and/or governments may better assess taxes, allocate subsidies, determine regional food capacity, plan infrastructure, and the like.

To the extent that mapping data related to agricultural land may exist, such data tends to be inconsistent, inaccurate, out of date, and/or otherwise incomplete for many practical uses. For example, a governmental entity may survey or sample a small portion of the total agricultural lands and/or farmers within a geographical region and extrapolate the small data set to approximate the field locations, sizes, shapes, crop types, counts, etc. of all the agricultural lands actually in existence within the geographical region. Due to the labor-intensive nature of gathering such data, the agricultural land data tends to be updated infrequently (or too infrequently for many commercial purposes.

Agricultural land use tends to vary from region to region or over time. Farms tend to be significantly smaller in size in developing countries than in developed countries. Crops may also change from season to season or from one year to the next for the same field. Agricultural land may be re-purposed for non-agricultural uses (e.g., housing developments). Thus, it would be beneficial to inexpensively, accurately, and frequently identify agricultural land on a sufficiently granular level for one or more particular geographical regions and the crop(s) growing on the agricultural land.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for crop type classification in images are described herein. In some embodiments, a method comprises obtaining a plurality of image sets associated with a geographical region and a time period, wherein each image set of the plurality of image sets comprises multi-spectral and time series images that depict a respective particular portion of the geographical region during the time period; predicting one or more crop types growing in each of particular locations within the particular portion of the geographical region associated with an image set of the plurality of image sets; determining a crop type classification for each of the particular locations based on the predicted one or more crop types for the respective particular locations; and generating a crop indicative image comprising at least one image of the multi-spectral and time series images of the image set overlaid with indications of the crop type classification determined for the respective particular locations.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
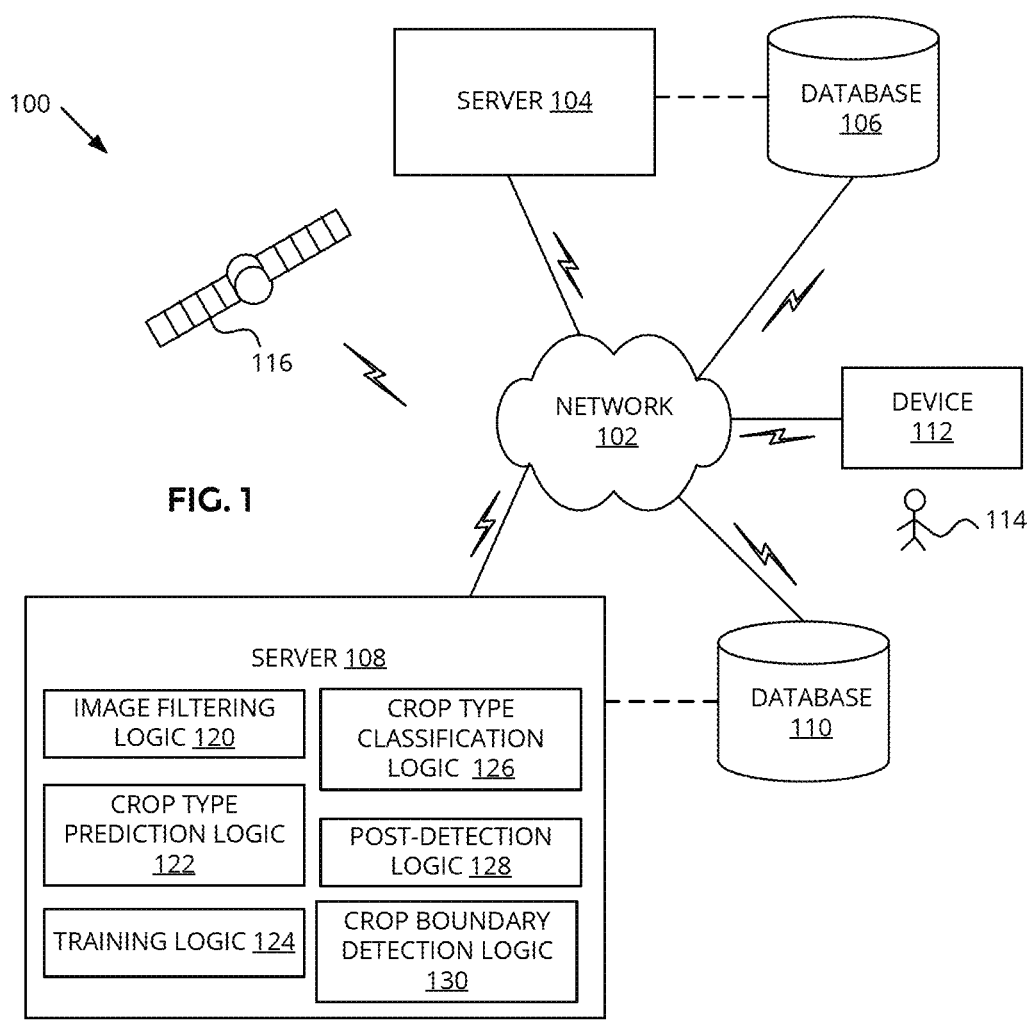
FIG. 1 depicts a block diagram illustrating a network view of an example system incorporated with the crop type classification technology of the present disclosure, according to some embodiments.

FIG. 1 depicts a block diagram illustrating a network view of an example system 100 incorporated with the crop type classification technology of the present disclosure, according to some embodiments. System 100 may include a network 102, a server 104, a database 106, a server 108, a database 110, a device 112, and an aerial image capture device 116. One or more of the server 104, database 106, server 108, database 110, device 112, and aerial image capture device 116 may communicate with the network 102. At least the server 108 may include the crop type classification technology of the present disclosure to facilitate automatic identification of crop type(s) in images at a sub-meter resolution, as described more fully below.

Network 102 may comprise one or more wired and/or wireless communications networks. Network 102 may include one or more network elements (not shown) to physically and/or logically connect computer devices to exchange data with each other. In some embodiments, network 102 may be the Internet, a wide area network (WAN), a personal area network (PAN), a local area network (LAN), a campus area network (CAN), a metropolitan area network (MAN), a virtual local area network (VLAN), a cellular network, a carrier network, a WiFi network, a WiMax network, and/or the like. Additionally, in some embodiments, network 102 may be a private, public, and/or secure network, which may be used by a single entity (e.g., a business, school, government agency, household, person, and the like). Although not shown, network 102 may include, without limitation, servers, databases, switches, routers, gateways, base stations, repeaters, software, firmware, intermediating servers, and/or other components to facilitate communication.

Server 104 may comprise one or more computers, processors, cellular infrastructure, network infrastructure, back haul infrastructure, hosting servers, servers, work stations, personal computers, general purpose computers, laptops, Internet appliances, hand-held devices, wireless devices, Internet of Things (IoT) devices, portable devices, and/or the like configured to facilitate collection, management, and/or storage of aerial images of land surfaces at one or more resolutions (also referred to as land surface images, land images, imageries, or images). For example, server 104 may command device 116 to obtain images of one or more particular geographical regions, to traverse a particular orbit, to obtain images at a particular resolution, to obtain images at a particular frequency, to obtain images of a particular geographical region at a particular time period, and/or the like. As another example, server 104 may communicate with device 116 to receive images acquired by the device 116. As still another example, server 104 may be configured to obtain/receive images with associated crop relevant information included (e.g., crop type identification, crop boundaries, road locations identified, and/or other annotated information) from governmental sources, users (e.g., such as user 114), and the like. As will be discussed in detail below, images with associated crop relevant information included may comprise human labeled images, United States Department of Agriculture (USDA) Cropland data layer (CDL) data, United States Farm Service Agency (FSA) Common Land Units (CLU) data, ground truth data, and/or the like.

Server 104 may communicate with device 116 directly with each other and/or via network 102. In some embodiments, server 104 may include one or more web servers, one or more application servers, one or more intermediating servers, and the like.

Database 106 may comprise one or more storage devices to store data and/or instructions for use by server 104, device 112, server 108, and/or database 110. For example, database 106 may include images and associated metadata provided by the device 116. The content of database 106 may be accessed via network 102 and/or directly by the server 104. The content of database 106 may be arranged in a structured format to facilitate selective retrieval. In some embodiments, database 106 may comprise more than one database. In some embodiments, database 106 may be included within server 104.

Server 108 may comprise one or more computers, processors, cellular infrastructure, network infrastructure, back haul infrastructure, hosting servers, servers, work stations, personal computers, general purpose computers, laptops, Internet appliances, hand-held devices, wireless devices, Internet of Things (IoT) devices, portable devices, and/or the like configured to implement one or more features of the crop type classification technology of the present disclosure, according to some embodiments. Server 108 may be configured to use images and possible associated data provided by the server 104/database 106 to train and generate a machine learning based model that is capable of automatically detecting crop boundaries and classifying crop type(s) within the crop boundaries in a plurality of images of land surfaces. The crop type classification may be at a sub-meter level of granularity or ground resolution. The "trained" machine learning based model may be configured to identify the crop boundaries and classify the crop types in images unsupervised by humans. The model may be trained by implementing supervised machine learning techniques. Server 108 may also facilitate access to and/or use of images with the crop type classification.

Server 108 may communicate with one or more of server 104, database 106, database 110, and/or device 112 directly or via network 102. In some embodiments, server 108 may also communicate with device 116 to facilitate one or more functions as described above in connection with server 104. In some embodiments, server 108 may include one or more web servers, one or more application servers, one or more intermediating servers, and/or the like.

Server 108 may include hardware, firmware, circuitry, software, and/or combinations thereof to facilitate various aspects of the techniques described herein. In some embodiments, server 108 may include, without limitation, image filtering logic 120, crop type prediction logic 122, training logic 124, crop type classification logic 126, post-detection logic 128, and crop boundary detection logic 130. As will be described in detail below, image filtering logic 120 may be configured to apply one or more filtering, "cleaning," or de-noising techniques to images to remove artifacts and other undesirable data from the images. Crop type prediction logic 122 may be configured to predict crop type(s) growing within each of the crop areas defined by crop boundaries. Crop type prediction logic 122 may comprise at least a portion of the "trained" machine learning based model. Training logic 124 may be configured to facilitate supervised learning, training, and/or refinement of one or more machine learning techniques to generate/configure the crop type prediction logic 122. Alternatively, training logic 124 may be configured to support unsupervised learning, semi-supervised learning, reinforcement learning, computer vision techniques, and/or the like.

Crop type classification logic 126 may be configured to classify or identify crop type(s) within each crop area associated with a crop boundary based on the crop type(s) predicted by the crop type prediction logic 122. Post-detection logic 128 may be configured to perform one or more post crop type classification activities such as, but not limited to, determining crop yields for different crop types, determining crop management practices/strategies, assigning a unique identifier to each crop field (or crop sub-field) associated with a detected crop boundary, providing crop fields (or sub-fields) search capabilities, and/or the like.

Crop boundary detection logic 130 may be configured to detect crop boundaries within images. In some embodiments, crop boundary detection logic 130 may be used to generate at least a portion of the ground truth data. In addition to, or alternatively, crop boundary detection logic 130 may comprise a portion of the "trained" machine learning based model for performing crop type classification, in which the "trained" model detects crop boundaries (so as to identify the crop areas/fields/sub-fields) and then the crops located within those crop areas/fields/sub-fields are classified by its crop type(s). As with the crop type prediction logic 122, training logic 124 may be configured to facilitate supervised learning, training, and/or refinement of one or more machine learning techniques to generate/configure the crop boundary detection logic 130.

In some embodiments, one or more of logic 120-130 (or a portion thereof) may be implemented as software comprising one or more instructions to be executed by one or more processors included in server 108. In alternative embodiments, one or more of logic 120-130 (or a portion thereof) may be implemented as firmware or hardware such as, but not limited to, an application specific integrated circuit (ASIC), programmable array logic (PAL), field programmable gate array (FPGA), and the like included in the server 108. In other embodiments, one or more of logic 120-130 (or a portion thereof) may be implemented as software while other of the logic 120-130 (or a portion thereof) may be implemented as firmware and/or hardware.

Although server 108 may be depicted as a single device in FIG. 1, it is contemplated that server 108 may comprise one or more servers and/or one or more of logic 120-130 may be distributed over a plurality of devices. In some embodiments, depending on computing resources or limitations, one or more of logic 120-130 may be implemented in a plurality of instances.

Database 110 may comprise one or more storage devices to store data and/or instructions for use by server 108, device 112, server 104, and/or database 110. For example, database 110 may include images provided by server 104/database 106/device 116, ground truth data used to build and/or train the crop type prediction logic 122, crop type heat maps generated by the crop type prediction logic 122, crop type classifications generated by the crop type classification logic 126, identifiers and other associated image and/or crop type information, data to be used by any of logic 120-130, data generated by any of logic 120-130, data to be accessed by user 114 via device 112, and/or data to be provided by user 114 via device 112. The content of database 110 may be accessed via network 102 and/or directly by the server 108. The content of database 110 may be arranged in a structured format to facilitate selective retrieval. In some embodiments, database 110 may comprise more than one database. In some embodiments, database 110 may be included within server 108.

Device 112 may comprise one or more computers, work stations, personal computers, general purpose computers, laptops, Internet appliances, hand-held devices, wireless devices, Internet of Things (IoT) devices, portable devices, smart phones, tablets, and/or the like. In some embodiments, the user 114 may interface with the device 112 to provide data to be used by one or more of logic 120-130 (e.g., manual identification of crop boundaries and crop types on select images to serve as ground truth data) and/or to request data associated with the classified crop types (e.g., search for a particular crop field (or sub-field), request visual display of particular images overlaid with crop type information). At least the training logic 124 and/or post-detection logic 128 may facilitate functions associated with the device 112. The user 114 providing data for use in crop type classification may be the same or different from a user that requests data that has been generated in accordance with performance of the crop type classification model.

Device 116 may comprise one or more of satellites, airplanes, drones, hot air balloons, and/or other devices capable of capturing a plurality of aerial or overhead photographs of land surfaces. The plurality of aerial photographs may comprise a plurality of multi-spectral, time series images. Device 116 may include one or more location tracking mechanisms (e.g., global positioning system (GPS)), multi-spectral imaging mechanisms (all frequency bands), weather condition detection mechanisms, time date stamp generation mechanisms, mechanism to detect the distance from the land surface, and/or associated image metadata generation capabilities to provide associated image information for each image of the plurality images captured. Device 116 may be manually and/or automatically operated, and the captured images may be provided via a wired or wireless connection to server 104, server 108, or other devices. Device 116 may also be deployed over the same locations a plurality of times over a particular time period so as to capture time series images of the same location. Examples of images (associated with ground truth data or for which automatic crop type classification may be desired) that may be provided by or generated from the images provided by device 116 include, without limitation, Landsat 7 satellite images, Landsat 8 satellite images, Google Earth images, and/or the like.

Although discrete components are discussed above in connection with FIG. 1, components may be combined. For instance, servers 104 and 108 may comprise a single component, databases 106 and 110 may comprise a single component, and/or device 112 may be combined with server 108.

Figure 2:
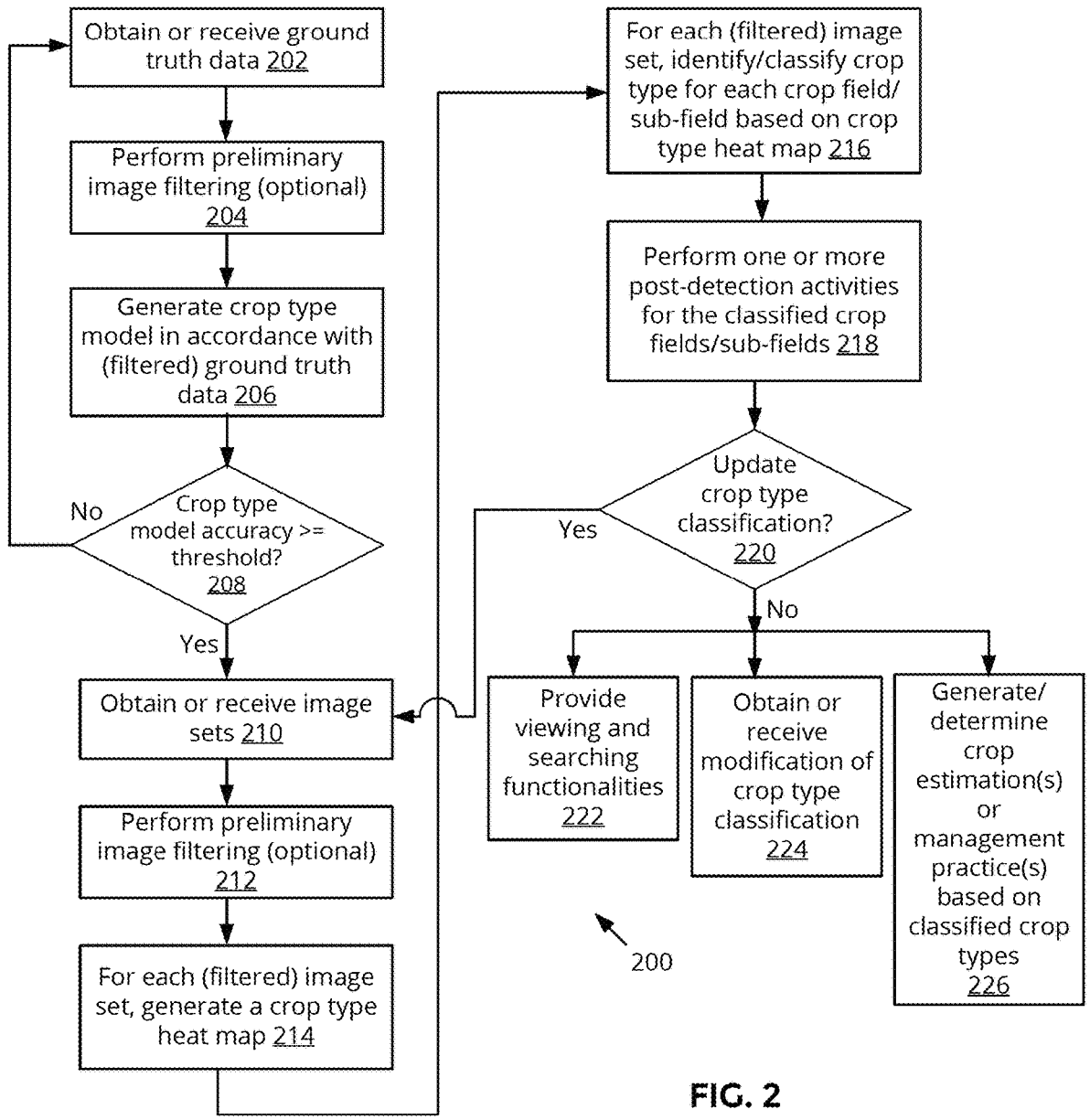
FIG. 2 depicts a flow diagram illustrating an example process that may be implemented by the system of FIG. 1, according to some embodiments.

FIG. 2 depicts a flow diagram illustrating an example process 200 that may be implemented by the system 100 to generate a crop type classification model, perform crop type classification using the generated crop type classification model, and various uses of the crop type classification information, according to some embodiments.

At block 202, training logic 124 may be configured to obtain or receive ground truth data comprising a plurality of land surface images with identified crop boundaries (or corresponding crop areas) and crop types therein classified. The plurality of images comprising the ground truth data may be selected to encompass those having a variety of land features, crop boundaries, crop types, and the like so as to train/generate a detection model capable of handling a variety of land features, crop boundaries, or crop types that may be present in unknown images to be classified.

In some embodiments, the plurality of images may comprise images containing multi-spectral data (e.g., red green blue (RGB) spectrum, visible spectrum, near infrared (NIR), normalized difference vegetative index (NDVI), infrared (IR), all spectral bands, or the like) (also referred to as multi-spectral images or imagery). The plurality of images may also comprise time series images, in which a same geographical location may be imaged a plurality of times over a particular time period. The particular time period may comprise, without limitation, a crop growing season (e.g., May to October), a year, a plurality of years, years 2008 to 2016, and/or other pre-determined times. The imaging frequency may be hourly, daily, weekly, bi-weekly, monthly, seasonally, years, or the like. The images associated with a particular geographical location and, optionally, for a particular time period, may be referred to as an image set. A plurality of image sets may be included in the ground truth data.

Ground truth data may comprise, but is not limited to: (1) images with crop boundaries (or crop areas) identified—such images may be manually identified by users and/or the results of automatic crop boundary detection (an example of which is described in FIG. 3); (2) images with crop types classified/identified/specified—such images may be manually identified by users and/or obtained from governmental or publicly available sources; and/or (3) images with both crop boundaries and crop types identified—such images may be manually identified by users and/or obtained from governmental or publicly available sources.

Image features that are manually identified by users may also be referred to as human labeled data or human labeled images. One or more users, such as user 114, may annotate select images via a graphical user interface (GUI) mechanism provided on the device 112, for example. Images with crop boundaries and/or crop types identified obtained from governmental or publicly available sources may provide such identification at a lower ground resolution or accuracy than may be provided by the crop type classification scheme of the present disclosure. For example, the ground resolution may be at a 30 meter resolution, greater than a meter resolution, or the like. Crop boundaries and/or type identification from governmental or publicly available sources may also be provided as farmer reports, sample based data, survey based data, extrapolations, and/or the like. An example of governmental/publicly available data of geo-identified crop boundaries and types may be the USDA CDL data for years 2008-2016 at a 30 meter per pixel (ground) resolution.

Training logic 124 may facilitate selection of images, presentation of selected images for human labelling, use of human labeled images, obtaining governmental/publicly available crop boundary and/or crop type identified data, and/or the like. Ground truth data may also be referred to as training data, model building data, model training data, and the like.

In some embodiments, the time period and/or geographical region(s) associated with the ground truth data may be the same (or approximately the same) as the time period and/or geographical region(s) associated with the images for which the crop types are to be identified (at block 216). For example, for images taken during years 2008 to 2016 to be acted upon at block 216, the CLU data from the year 2008 may be used, the CDL data from the years 2008-2016 may be used, and the human labeled data may comprise images taken during 2008 to 2016. CLU and CDL data may comprise image data of the United States and the images in the human labeled data may also comprise images of the United States.

Next, at block 204, image filtering logic 120 may be configured to perform preliminary filtering of one or more images comprising the ground truth data. In some embodiments, the preliminary filtering may comprise monitoring for clouds, shadows, haze, fog, atmospheric obstructions, and/or other land surface obstructions included in the images on a per pixel basis. On a per pixel basis, if such obstruction is detected, then the image filtering logic 120 may be configured to determine whether to address the obstruction, how to correct for the obstruction, whether to omit the image information associated with the pixel of interest in constructing the model at block 206, and/or the like. For example, if a first pixel does not include land surface information because of a cloud but a geographical location associated with a second pixel adjacent to the first pixel is imaged because it is not obscured by a cloud, then the image filtering logic 120 may be configured to change the first pixel value to the second pixel value. As another example, known incorrect pixel values in a given image may be substituted with pixel values from corresponding pixels in another image within the same image set (e.g., from a different image in the same time series for the same geographical location). In other embodiments, block 204 may be optional if, for example, the images are known to be cloud-free and otherwise atmospheric obstruction-free.

With the ground truth data obtained and, optionally, preliminarily filtered or corrected, the resulting ground truth data may be applied to one or more machine learning techniques/systems to generate or build a crop type model, at block 206. In some embodiments, the crop type model may comprise the crop type prediction logic 122. The machine learning technique/system may comprise, for example, a convolutional neural network (CNN) or supervised learning system. The crop type model may be configured to provide a probabilistic prediction of one or more crop type classification for each pixel corresponding to a particular geographic location associated with an image set provided as the input. Crop types may comprise, but are not limited to, rice, wheat, maize/corn, soy, sorghum, legumes, fruits, vegetables, oil seeds, nuts, pasture, and/or the like.

Since ground truth data comprises images with crop boundaries and crop types accurately identified, the machine learning technique/system may learn what land surface features in images are indicative of crop areas and the type(s) of crops are being grown within those crop areas. Such knowledge, when sufficiently detailed and accurate, may then be used to automatically identify crop types in images for which crop types may be unknown.

In order to make a prediction of the crop type(s) within a crop area, a prediction of the existence of the crop area may be involved so that at the very least, the portions of the image to be analyzed to make crop type predictions may be reduced or minimized. Accordingly, in some embodiments, the crop boundary detection logic 130 along with the crop type prediction logic 122 may be considered part of the crop type model. Crop boundary detection logic 130 is discussed in connection with FIG. 3. Crop type model may also be referred to as a crop type classification model.

In some embodiments, the crop type model may be associated with a particular geographical region, the same geographical region captured in the images comprising the ground truth data. For example, the crop type model may be specific to a particular county within the United States. Likewise, the crop type model may also be associated with a particular time period, the same time period associated with the images comprising the ground truth data. As the geographical region gets larger, data inconsistencies or regional differences may arise, which may result in a less accurate crop type model.

Next, the training logic 124 may be configured to determine whether the accuracy of the crop type model equals or exceeds a pre-determined threshold. The pre-determined threshold may be 70%, 80%, 85%, 90%, or the like. If the model's accuracy is less than the pre-determined threshold (no branch of block 208), then process 200 may return to block 202 to obtain/receive additional ground truth data to apply to the machine learning techniques/systems to refine the current crop type model. Providing additional ground truth data to the machine learning techniques/systems comprises providing additional supervised learning data so that the crop type model may be better configured to predict what type(s) of crop is growing/has grown in a crop area. One or more iterations of blocks 202-208 may occur until a sufficiently accurate crop type model may be built.

If the model's accuracy equals or exceeds the pre-determined threshold (yes branch of block 208), then the crop type model may be deemed to be acceptable for use in unsupervised or automatic crop type classification for images in which crop types (and crop boundaries) are unknown. At block 210, a plurality of images to be applied to the crop type model for automatic classification may be obtained or received. The plurality of images may be those captured by the device 116.

In some embodiments, the plurality of images may comprise a plurality of image sets, in which each image set of the plurality of image sets may be associated with a respective portion/area (e.g., a county of the United States) of a plurality of portions/areas (e.g., all counties of the United States) that collectively comprise a geographical region (e.g., the United States) for which crop types of all the crop fields/sub-fields located therein may be desired to be classified. For each portion/area of the plurality of portions/areas, the associated image set may comprise: (1) at least one image for each of a plurality of time points (e.g., May 1, June 1, July 1, August 1, September 1, and October 1) and (2) for a respective time point of the plurality of time points, there may also be one or more images, in which each image may provide specific/different spectral information from another image taken at the same time point (e.g., a first image taken on May 1 comprises a RGB image, a second image taken on May 1 comprises a NIR image, a third image taken on May 1 comprises a NDVI image, etc.).

The overall geographical region covered by the plurality of images may be the same (or approximately the same) geographical region associated with the images used in block 202 to generate the crop type model. In other words, the crop type model generated in block 206 may have been developed specifically tailored for use on the images in block 210. Such a crop type model may also be referred to as a local or localized crop type model. The plurality of images obtained in block 210 may also be associated with the same time period as the time period of the crop type model. Continuing the above example, the crop type model generated in block 206 may be associated with the United States and the years 2008-2016 (because the images used to train and build the model were images of the United States taken during the years 2008-2016) and the plurality of images in block 210 may similarly be images of the United States taken during the years 2008-2016.

Each image within an image set may depict the same land location (at the same orientation and at the same distance from the surface) except that the images differ from each other in multi-spectral and/or time series content. Hence, each image within the image set may be the "same" image except that land surface features may differ across different times and/or different spectrums/color composition schemes. In some embodiments, images within image sets comprising the ground truth data in block 202 may have similar characteristics.

The images of block 210 may then be preliminarily filtered by the image filtering logic 120, at block 212. In some embodiments, block 212 may be similar to block 204 except the images acted upon are those of block 210 rather than those of block 202. In other embodiments, if the images were taken (or retaken, as necessary) to ensure that clouds and other obstructions are not present in the images, then block 212 may be optional.

Next at block 214, crop type prediction logic 122 (with assistance from the crop boundary detection logic 130, in some embodiments) may be configured to determine a crop type heat map for each (filtered) image set of the plurality of image sets obtained in block 210. For each image set of the plurality of image sets, the image set may be provided as inputs to the crop type model generated in block 206, and in response, the crop type model may provide a prediction/determination of the crop type(s) within each crop area on a per pixel or per crop area basis. Each pixel (or crop area) of the heat map may indicate the relative or absolute probability of specific crop type(s). In some embodiments, the heat map may be vectorized from a raster format.

A single crop area may have one or more than one crop type predicted. If the crop type heat map is visually presented, each crop type of a plurality of crop types may be assigned a different color from each other and the intensity/shade of a particular color overlaid on the image may indicate the statistical probability of the accuracy of the crop type prediction, for example. As another example, the crop type and/or predictive strength/accuracy may be expressed as text in the image.

The multi-spectral and time series images comprising an image set for the same geographical area may permit detection of specific land surface feature changes over time, which facilitates determination of whether a particular area is more likely to be a crop area and what crop(s) is likely growing within the crop area. For example, crop colors may change over the course of the growing season. Crop fields before planting, during the growing season, and after harvest may look different from each other. Particular patterns of crop color changes over time may indicate the type of crop being grown (e.g., wheat, soy, corn, etc.). When a crop is planted and/or harvested may indicate the type of crop being grown. If a first type of crop is grown in a given crop field in a first year and then a second type of crop different from the first type of crop is grown in the same crop field in a second year, the changes detected between the two years may indicate that the geographical location associated with that crop field may be a crop area. Different crop types may have different planting pattern characteristics (e.g., the distance between adjacent rows of plantings may differ for different crop types).

Next, at block 216, the crop type classification logic 126 may be configured to classify crop types for crop areas based on the crop type heat map, for each image set of the plurality of image sets of block 210. In some embodiments, if more than one crop type is predicted for a given crop area, a majority voting rule may be applied in which the crop type with the highest probability from among the crop types predicted may be selected as the crop type for the given crop area. If there is no dominant majority crop type predicted (e.g., a crop type is predicted at 70% or higher probability), then the given crop area may be split into a plurality of crop sub-areas with each of the crop sub-areas assigned a respective crop type of the plurality of crop types predicted for the given crop area. For example, if a given crop area has a first crop type prediction at 30% probability, a second crop type prediction at 40% probability, and a third crop type prediction at 30% probability, then the margin of error in the probabilities may be such that no dominant crop type prediction may exist. In this case, the given crop area may be subdivided into a first, second, and third crop sub-areas and assigned first, second, and third crop types, respectively.

In alternative embodiments, supplemental knowledge may be used with the crop type heat map to make a final classification of crop types for the crop areas. For example, if certain crop types do not or cannot grow in the same geographical location at the same time, then if such incompatible crop types are predicted for the same crop area, then one or more of the crop types that are less or least likely to be grown in the geographical location may be ignored.

Crop boundaries associated with each crop area/field/sub-field may be determined or identified to a sub-meter (ground) resolution, a resolution of approximately 0.15 to 0.2 meter, a resolution less than 0.5 meter, a resolution less than approximately 0.2 meter, and the like. By extension, the crop type classification of each crop area/field/sub-field may also be deemed to be classified to a sub-meter ground resolution, a resolution of approximately 0.15 to 0.2 meter, a resolution less than 0.5 meter, a resolution less than approximately 0.2 meter, and the like.

In some embodiments, at least some of the images of an image set, associated with a particular portion of the overall geographical region of interest (e.g., images obtained block 210), may be at different resolutions from each other and/or at a resolution lower than the resolution associated with the crop type classification outputted by the crop type classification logic 126. For example, outputs comprising crop types may be classified at a ground resolution of less than a meter (less than a meter per pixel) or 0.1 meter (at 0.1 meter per pixel) even though at least some of the images provided as inputs have a ground resolution of 5 meter.

Crop boundaries may define close shaped areas. Crop boundaries may comprise crop field boundaries or, in the presence of sufficient information in the image set and/or prior knowledge information, crop sub-field boundaries. Crop field boundaries may define a crop field, which may comprise a physical area delineated by fences, permanent waterways, woodlands, roads, and the like. A crop sub-field may comprise a subset of a crop field, in which a portion of the physical area of the crop field contains predominantly a particular crop type that is different from a predominant crop type in another portion of the physical area of the crop field. Each of the different crop type portions of the physical area may be deemed to be a crop sub-field. Thus, a crop field may contain one or more crop sub-fields. For example, a crop field may include a first crop sub-field of corn and a second crop sub-field of soy.

In some embodiments, the crop type heat map provided by the crop type prediction logic 122 may indicate the likelihood of crop type(s) for each crop area, while the crop type classification logic 126 may be configured to make a final determination of which pixels associated with a crop area is to be assigned which crop type from among the crop type(s) predicted for the crop area.

With the crop types classified to a crop sub-field level for all the image sets, process 200 may proceed to block 218, in which the post-detection logic 128 may be configured to perform one or more post-detection activities in accordance with the classified crop/cropland sub-fields for all of the image sets (e.g., for the overall geographical region). For each crop field/sub-field with the crop type classified, post-detection activities may include, without limitation, calculating the area of the crop field/sub-field, assigning a unique identifier to the crop field/sub-field (e.g., a unique computer generated identification number (GUID) that will never be reused on another crop field/sub-field), classifying the crop field/sub-field within a classification system (e.g., the crop field/sub-field may be classified, assigned, labeled, or associated with a particular continent, country, state, county, and the like), and/or generating associated metadata for use in storage, retrieval, search, and/or updating activities. In some embodiments, post-detection activities may further include overlaying indications of identified crop fields/sub-fields and crop types on the original images so as to visually present the crop type classification results, and otherwise visually augmenting the original images with detected information. Data resulting from the post-detection activities may be maintained in database 110.

In some embodiments, for each image set, the post-detection logic 128 may be configured to generate a new image (also referred to as a crop indicative image) depicting the original image (e.g., at least one image of the plurality of images comprising the image set) overlaid with indicators of the determined crop type(s). Image 340 shown in FIG. 3A is an example of the new image.

Figure 3A:
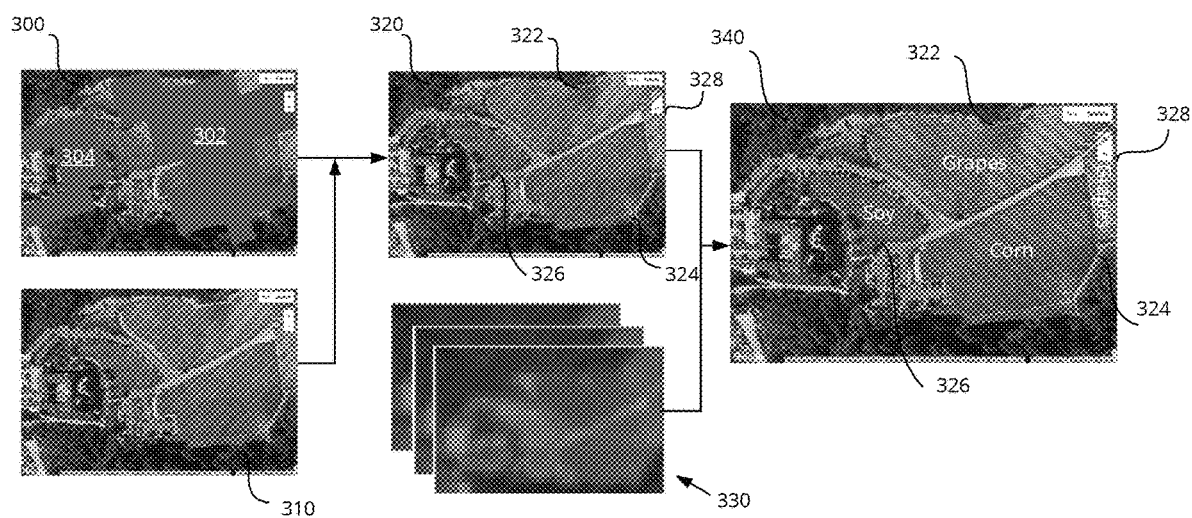
FIGS. 3A-3B depict example images in accordance with the crop type classification technique of the present disclosure, according to some embodiments.

FIG. 3A depicts various images that may be used or generated in the course of crop type classification of the present disclosure, according to some embodiments. Image 300 may comprise an example of low resolution ground truth data. Image 300 may be at a resolution of 30 meter/pixel, an example of a USDA CDL data image, and/or the like. Image 300 may include indications 302 and 304 indicative of locations of crop areas and, optionally, crop type(s) for the crop areas. Because image 300 comprises a low resolution image, crop area locations and crop type classification for particular locations may be approximate at best.

Image 310 may comprise an example of an image of an image set of the plurality of image sets (e.g., an image obtained/received in block 210). Image 310 may comprise a high resolution image having a resolution, for example, of 0.15 meter/pixel, acquired on a yearly basis, and/or the like. In some embodiments, images 300 and 310 may be associated with the same geographical location. Images 330 may also comprise examples of images of the image set of the plurality of image sets. Images 310 and 330 may comprise images of the same image set. Images 330 may comprise examples of low resolution, time series images, acquired on a monthly basis, and/or the like.

As described above, in the course of performing crop type classification, crop boundaries may be identified. Image 320 depicts a visual illustration of crop boundaries that may be identified in image 310. Image 320 may comprise image 310 overlaid with indications of identified crop boundaries 322, 324, 326, and 328. Image 320 may comprise a high resolution image at a resolution, for example, of 0.15 meter/pixel.

With the crop boundaries identified for the image set, the images of the image set may be additionally used to determine crop type(s) for each of the identified crop boundaries. Image 340 may comprise image 310 or 320 with indications of crop type classifications for respective crop boundaries included. The crop types for crop boundaries 322, 324, 326, 328 are "grapes," "corn," "soy," and "grapes," respectively. Image 340 may comprise a high resolution (e.g., at 0.15 meter/pixel) image.

If viewing, searching, or other activities involving particular crop fields/sub-fields or crop types is performed, such generated new image may be displayed to the user.

Next at block 220, post-detection logic 128 may be configured to determine whether crop type classification is to be updated. An update may be triggered based on availability of new images (e.g., in near real time to potential changes in one or more crop boundaries, new growing season, etc.), a time/date event (e.g., a new year, a new growing season), enough time lapsed since the last update, some pre-set time period (e.g., periodically, weekly, bi-weekly, monthly, seasonally, yearly, etc.), and/or the like. If an update is to be performed (yes branch of block 220), then process 200 may return to block 210. If no update is to be performed (no branch of block 220), then process 200 may proceed to blocks 222, 224, and 226.

At block 222, post-detection logic 128 may be configured to provide crop type data viewing and searching functionalities. Application programming interfaces (APIs), websites, apps, and/or the like may be implemented for users to variously access the crop type data. For example, users may search for all crop areas classified a particular crop type, crop areas within a particular country classified a particular crop type, crop area size by crop types, crop yields for different crop types, crop management practices for different crop types, or any other search parameters. Images overlaid with crop boundary and crop type indications may be displayed to users. Users may perform searches and view crop type data via the device 112, for instance.

At block 224, post-detection logic 128 may be configured to facilitate accepting modification of crop type classification of particular crop fields/sub-fields that have been automatically identified, by authorized users. The farmer that planted the crops in a particular crop field/sub-field may notice that the crop type in the database for that crop field/sub-field is incorrect or incomplete and may manually label images with the correct crop type(s). Modification capabilities may be similar to generating human labeled images in block 202. Provided modifications, which may be subject to approval, may then be used to update the database 110. The provided modifications may also be used as ground truth data to refine the crop type model.

The determined crop type classifications may be extensible for a variety of uses. At block 226, post-detection logic 128 may be configured to perform one or more of the following based on the crop type classifications and/or crop characteristics detected in the course of performing the crop type classifications: estimate crop yield per crop type (e.g., per crop type, per county, per crop type and county, per crop type and country, etc.); determine crop management practices per crop type (e.g., estimate harvest date, determine when to apply fertilizer, determine type of fertilizer to apply); diagnose drop diseases; control or cure crop diseases; identify different cultivars within crop types; determine crop attributes (e.g., based on direction of crops planted); and the like.

Figure 3B:
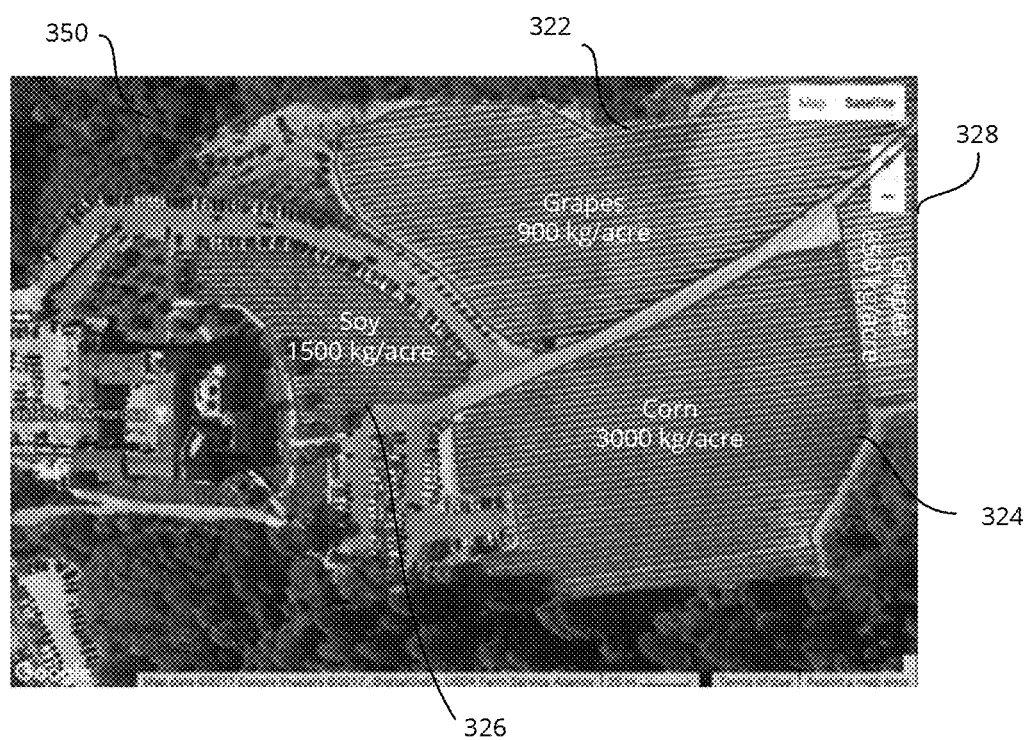

FIG. 3B depicts an example presentation of crop yield estimates calculated from the crop type classification data, according to some embodiments. Image 350 may comprise the same image as image 340 further supplemented with crop yield estimates for each crop field/sub-field. As shown, corn yield is greater than grape or soy yield on a per acre basis. If similar estimates are calculated for each of the different crop types for all crop fields/sub-fields within a geographical region (e.g., United States), then aggregate crop production for each crop type may be known.

In this manner, a complete database of crop fields/sub-fields (or crop boundaries) with classified crop types for a given geographical region (e.g., county, state, country, continent, planet) may be automatically generated, which is granular to a sub-meter resolution, and which may be kept up-to-date over time with minimal supervision. For a plurality of geographical regions, assuming ground truth data for respective geographical regions of the plurality of geographical regions exists, process 200 may be performed for each of the plurality of geographical regions.

Figure 4:
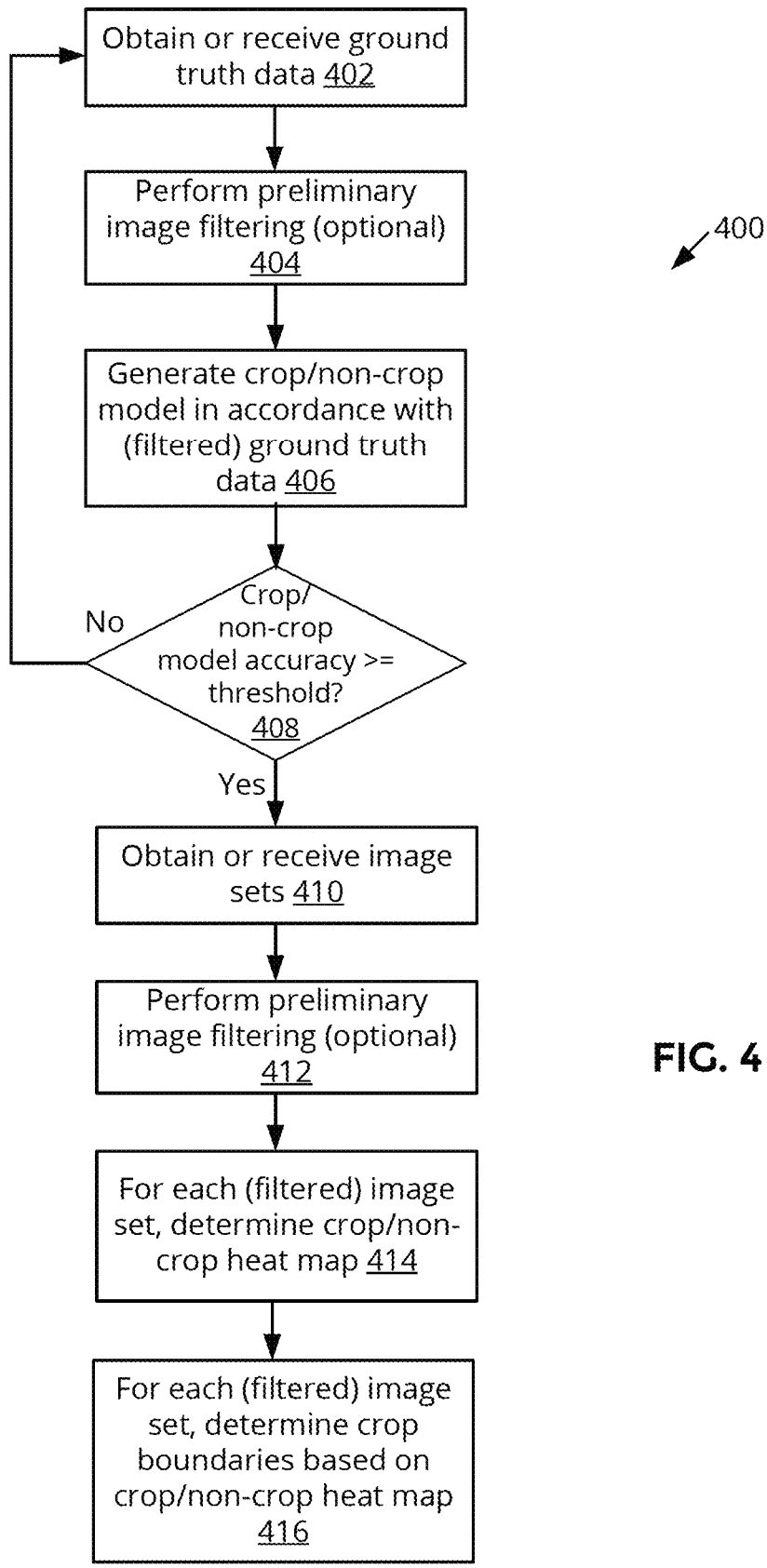
FIG. 4 depicts a flow diagram illustrating another example process that may be implemented by the system of FIG. 1, according to some embodiments.

FIG. 4 depicts a flow diagram illustrating an example process 400 that may be implemented by the system 100 to automatically detect crop boundaries (and correspondingly, crop areas/fields/sub-fields) in images, according to some embodiments. The crop boundaries detected in block 416 of FIG. 4 may comprise the crop boundary detection results mentioned above for the ground truth data in block 202 of FIG. 2. In some embodiments, the crop boundary detection performed by the crop type model in the course of generating the crop type heat map may comprise at least blocks 414 and 416 of FIG. 4.

At block 402, training logic 124 may be configured to obtain or receive ground truth data comprising a plurality of land surface images with identified crop boundaries. The plurality of images comprising the ground truth data may be selected to encompass those having a variety of land features, crop boundaries, and the like so as to train/generate a detection model capable of handling different land features and crop boundaries that may be present in images to undergo detection. In some embodiments, the plurality of images may be similar to those discussed above for block 202 of FIG. 2 except crop boundaries are identified instead of crop types classified.

In some embodiments, ground truth data for crop boundary detection may comprise existing images with identified crop boundaries (or crop areas) in which the crop boundaries (or crop areas) may be identified at a low (ground) resolution (e.g., greater than a meter resolution, 3 to 250 meter resolution, 30 meter resolution, etc.). Such images may be of high frequency, such as daily to bi-weekly refresh rate. Because the crop boundary identification is at a low resolution, such identification may be deemed to be "noisy," approximate, or inaccurate. Examples of existing images with low resolution identified crop boundaries may include, without limitation, the USDA CDL data, FSA CLU data, government collected data, sampled or survey based data, farmer reports, and/or the like. Existing images with identified crop boundaries may be obtained by the server 104, stored in database 106, and/or provided to the server 108.

In some embodiments, ground truth data may comprise CDL and CLU data (as discussed above) and/or human labeled data. Human labeled data may comprise crop boundaries in images that are manually identified, labeled, or annotated by, for example, user 114 via a graphical user interface (GUI) mechanism provided on the device 112. Such manual annotation may be at a higher (ground) resolution than may be associated with CDL and/or CLU data. Images that are manually labeled may be obtained from device 116, for example. Training logic 124 may facilitate selection of images, presentation of selected images, use of human labeled images, and/or the like. Ground truth data may also be referred to as training data, model building data, model training data, and the like.

In some embodiments, the time period and/or geographical region(s) associated with the ground truth data may be the same (or approximately the same) as the time period and/or geographical region(s) associated with the images for which the crop boundaries are to be detected (at block 216). For example, for images taken during years 2008 to 2016 to be acted upon at block 216, the CLU data from the year 2008 may be used, the CDL data from the years 2008-2016 may be used, and the human labeled data may comprise images taken during 2008 to 2016. CLU and CDL data may comprise image data of the United States and the human labeled data may also comprise image data of the United States.

Next, at block 404, image filtering logic 120 may be configured to perform preliminary filtering of one or more images comprising the ground truth data. In some embodiments, the preliminary filtering may comprise monitoring for clouds, shadows, haze, fog, atmospheric obstructions, and/or other land surface obstructions included in the images on a per pixel basis. Block 404 may be similar to block 204 except the images filtered are the images comprising the ground truth data of block 402.

With the ground truth data obtained and, optionally, preliminarily filtered or corrected, the resulting ground truth data may be applied to one or more machine learning techniques/systems to generate or build a crop/non-crop model, at block 406. The machine learning technique/system may comprise, for example, a convolutional neural network (CNN) or supervised learning system. The crop/non-crop model may be configured to provide a probabilistic prediction of crop or non-crop for each pixel corresponding to a particular geographic location associated with an image set provided as the input. The crop/non-crop model may comprise a portion of the crop boundary detection logic 130. Since ground truth data comprises images with crop boundaries accurately identified, the machine learning technique/system may learn which land surface features in images are indicative of crops or not crops. Such knowledge, when sufficiently detailed and accurate, may then be used to automatically identify crop boundaries in images for which crop boundaries may be unknown.

In some embodiments, the crop/non-crop model may be associated with a particular geographical region, the same geographical region captured in the images comprising the ground truth data. For example, the crop/non-crop model may be specific to a particular county within the United States. Likewise, the crop/non-crop model may also be associated with a particular time period, the same time period associated with the images comprising the ground truth data. As the geographical region gets larger, data inconsistencies or regional differences may arise, which may result in a less accurate crop/non-crop model.

Next, the training logic 124 may be configured to determine whether the accuracy of the crop/non-crop model equals or exceeds a pre-determined threshold. The pre-determined threshold may be 70%, 80%, 85%, 90%, or the like. If the model's accuracy is less than the pre-determined threshold (no branch of block 408), then process 400 may return to block 402 to obtain/receive additional ground truth data to apply to the machine learning techniques/systems to refine the current crop/non-crop model. Providing additional ground truth data to the machine learning techniques/systems comprises providing additional supervised learning data so that the crop/non-crop model may be better configured to predict whether a pixel depicts a crop (or is located within a crop field) or not a crop (or is not located within a crop field). One or more iterations of blocks 402-408 may occur until a sufficiently accurate crop/non-crop model may be built.

If the model's accuracy equals or exceeds the pre-determined threshold (yes branch of block 408), then the crop/non-crop model may be deemed to be acceptable for use in unsupervised or automatic crop/non-crop detection for images in which crop boundaries (or crop fields) are unknown. At block 410, a plurality of images to be applied to the crop/non-crop model for automatic detection may be obtained or received. A plurality of image sets may be obtained, in which each image set of the plurality of image sets is associated with the same (or nearly the same) geographical location and time period as the images in block 402. If the crop boundary detection results are to be used as ground truth data in block 202, the obtained images of block 410, the images of block 402, and the images of block 202 may all be associated with the same (or nearly the same) geographical location and time period. The plurality of images may be those captured by the device 116, images from Landsat 7, images from Landsat 8, Google Earth images, images of one or more different resolutions, and/or images acquired at one or more different frequencies.

The images of block 410 may then be preliminarily filtered by the image filtering logic 120, at block 412. In some embodiments, block 412 may be similar to block 404 except the images acted upon are those of block 410 rather than those of block 402. In other embodiments, if the images were taken (or retaken, as necessary) to ensure that clouds and other obstructions are not present in the images, then block 412 may be optional.

Next at block 414, crop boundary detection logic 130 may be configured to determine a crop/non-crop heat map for each (filtered) image set of the plurality of image sets obtained in block 410. For each image set of the plurality of image sets, the image set may be provided as inputs to the crop/non-crop model generated in block 406, and in response, the crop/non-crop model may provide a prediction/determination of whether a crop is depicted on a per pixel basis. In other words, predicting the presence of a crop (or no crop) at particular locations within the particular portion of the geographical region associated with a respective image set. Each pixel of the heat map may indicate the relative or absolute probability of a crop or not a crop. In some embodiments, the probabilistic predictions of crop/no crop provided by the heat map may be indicated by use of particular colors, patterns, shadings, tones, or other indicators overlaid on the original image. For example, a zero probability of a crop may be indicated by the absence of an indicator, the highest probability for a crop may be indicated by the darkest or brightest shade of red, and probabilities in between may be appropriately graduated in color, shade, tone, pattern, or the like between no indication and the darkest/brightest red color.

At block 416, the crop boundary detection logic 130 may be configured to determine crop boundaries based on the crop/non-crop heat map, for each image set of the plurality of image sets of block 410. In addition to use of the crop/non-crop heat map, the crop boundary location determination may also be in accordance with prior knowledge information, application of de-noising techniques, application of clustering and region growing techniques, and/or the like.

In some embodiments, crop boundary detection logic 130 may be configured to use prior knowledge information in determining the crop boundaries. Prior knowledge information may comprise, without limitation, known locations of roadways, waterways, woodlands, buildings, parking lots, fences, walls, and other physical structures; known information about agricultural or farming practices such as particular boundary shapes arising from particular agricultural/farming practices proximate to the geographical location associated with the image set (e.g., straight line boundaries or circular boundaries in the case of known use of pivot irrigation); crop types; and/or the like. De-noising or filtering techniques may be implemented to determine crop boundaries and/or to refine the crop boundaries. Applicable de-noising or filtering techniques may include, without limitation, techniques to smooth preliminarily determined crop boundaries (e.g., since in the absence of physical barriers, boundaries tend to be linear or follow a geometric shape). Similarly, clustering and region growing techniques may be employed to determine or refine the crop boundaries. Non-supervised clustering and region growing techniques may be used to reclassify stray pixels from non-crop to crop or vice versa in areas in which a few pixels deviate from a significantly larger number of pixels surrounding them. For instance, if a few pixels are classified as non-crop within a larger area that is classified as crop, then those few pixels may be reclassified as crop.

Crop boundaries may be determined or identified to a sub-meter (ground) resolution, a resolution of approximately 0.15 to 0.2 meter, a resolution less than 0.5 meter, a resolution less than approximately 0.2 meter, and the like. Crop boundaries may define close shaped areas. Crop boundaries may comprise crop field boundaries or, in the presence of sufficient information in the image set and/or prior knowledge information, crop sub-field boundaries. Crop field boundaries may define a crop field, which may comprise a physical area delineated by fences, permanent waterways, woodlands, roads, and the like. A crop sub-field may comprise a subset of a crop field, in which a portion of the physical area of the crop field contains predominantly a particular crop type that is different from a predominant crop type in another portion of the physical area of the crop field. Each of the different crop type portions of the physical area may be deemed to be a crop sub-field. Thus, a crop field may contain one or more crop sub-fields. For example, a crop field may include a first crop sub-field of corn and a second crop sub-field of soy.

In some embodiments, the crop/non-crop heat map may indicate the likelihood of crop areas, while the crop boundary detection logic 130 may be configured to make a final determination of which of the pixels indicated as likely to depict crops in the crop/non-crop heat map comprises crop field(s) or crop sub-field(s). The perimeter of a crop field or sub-field defines the associated crop field or sub-field boundary.

In this manner, crop boundaries to the crop sub-field level may be automatically detected. Such crop boundary detection results may be used as ground truth data in block 202. The crop boundary detection technique (or portions thereof) discussed herein may be included in the crop type model generated in block 206, in some embodiments.

Figure 5:
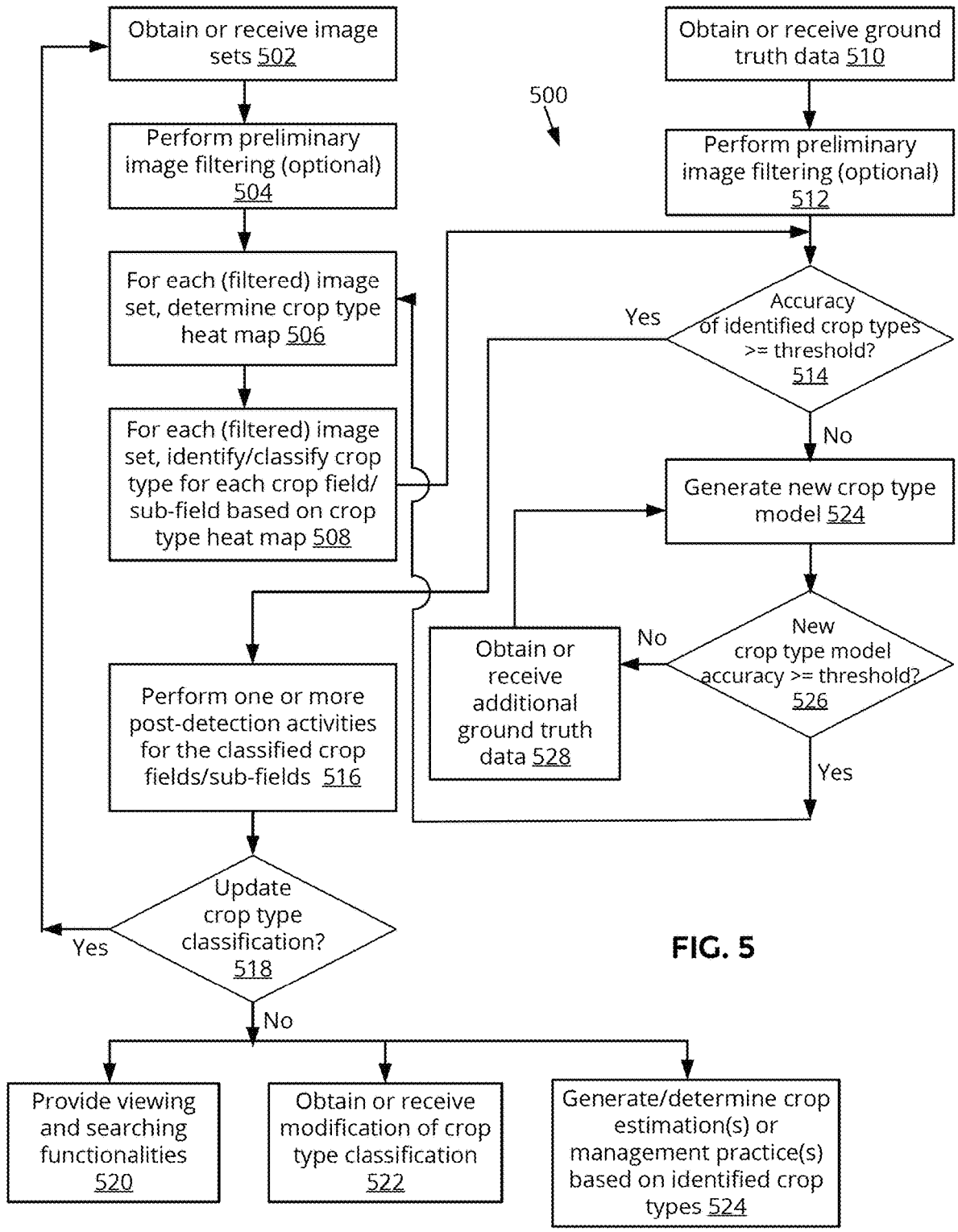
FIG. 5 depicts a flow diagram illustrating yet another example process that may be implemented by the system of FIG. 1, according to some embodiments.

FIG. 5 depicts a flow diagram illustrating an example process 500 that may be implemented by the system 100 to perform crop type classification using an existing crop type classification model and modifying the crop type classification model on an as needed basis, according to some embodiments. In some embodiments, blocks 502, 504, 506, 508 may be similar to respective blocks 210, 212, 214, 216 of FIG. 2, except that the image sets for which the crop type classification is performed may be associated with a geographical region and/or time period that differs from the geographical region and/or time period associated with the crop type model used in block 506.

Continuing the example above, the crop type model used in block 506 was generated based on images of the United States taken during years 2008-2016 while the image sets of block 502 may be images of the United States taken during years 2000-2007. As another example, the image sets of block 502 may be images of a geographical region other than the United States (e.g., a foreign country, China, Mexico, Canada, Africa, Eastern Europe, etc). As still another example, the image sets of block 502 may be images of a particular geographical region taken during years other than 2008-2016. Even though the crop type model may not be exactly tailored for the images to be processed, such model may be used as the starting point since it already exists. For countries outside the United States, no or insufficient publicly available ground truth data may exist to readily generate a crop type model.

In some embodiments, blocks 510-512 may be performed simultaneously with, before, or after blocks 502-508. Blocks 510, 512 may be similar to respective blocks 202, 204 of FIG. 2. The ground truth data obtained in block 510 may be associated with the same (or approximately the same) geographical region and/or time period as with the image sets of block 502. In some embodiments, the amount of ground truth data of block 510 may differ from the amount of ground truth data of block 202. A smaller amount of ground truth data may be available because little or no government/publically available crop data may exist for countries outside the United States or for earlier years.

At block 514, training logic 124 may be configured to evaluate the accuracy of at least a subset of crop types predicted using the existing crop type model in block 508 by comparison against crop types identified in the (filtered) ground truth data provided in blocks 510, 512. In some embodiments, crop type(s) classified for the same (or nearly the same) geographical areas in the two sets of identified crop type data may be compared to each other.

If the accuracy of the predicted crop types equals or exceeds a threshold (yes branch of block 514), then process 500 may proceed to blocks 516-522. The threshold may comprise a pre-set threshold such as 75%, 80%, 85%, 90%, or the like. The existing crop type model may be deemed to be suitable (or sufficiently accurate) for the particular geographical region and time period associated with the images of interest of block 502. In some embodiments, blocks 516, 518, 520, 522, 524 may be similar to respective blocks 218, 220, 222, 224, 226 of FIG. 2 except the crop type classification of interest are those determined in block 508. In block 518, if crop type classification are to be updated (yes branch of block 518), then process 500 may return to block 502. For crop type classification updates, blocks 510, 512, and 514 may not need to be repeated once the suitability/accuracy of the model has been initially confirmed.

If the accuracy of the predicted crop boundaries is less than a threshold (no branch of block 514), then process 500 may proceed to block 524. A new crop type model associated with the same (or nearly the same) geographical region and time period as the images obtained in block 502 may be generated. The new crop type model may comprise a modification of the existing crop type model or a model trained with only data corresponding to the geographical region and time period matching the images of interest. At block 524, the training logic 124 may be configured to generate a new crop type model based on (filtered) ground truth data of block 512 applied to one or more machine learning techniques/systems. Block 524 may be similar to block 206 of FIG. 2.

Next, at block 526, the accuracy of the new crop/non-crop model may be evaluated. If the accuracy is less than a threshold (no branch of block 526), then additional ground truth data may be obtained or received, at block 528, and training/refinement/building of the new crop type model may continue by returning to block 524. If the accuracy equals or exceeds the threshold (yes branch of block 526), then process 500 may proceed to block 506 to use the new crop type model with the (filtered) image sets from block 504 to generate crop type heat maps associated with the (filtered) image sets. In the case where a new crop type model has been generated due to insufficient accuracy of the existing crop type model, blocks 510, 512, 514 may not need to be repeated.

In this manner, classification of crop types for crop fields/sub-fields located in countries outside the United States and/or for time periods other than recent years may also be determined inexpensively, accurately, and automatically. Current and past (to the extent aerial image data is available) crop fields/sub-fields planet wide may be classified by crop type. Historical aerial images, potentially going back 20 to 40 years depending on the availability of aerial images, may be applied to the crop type model to retroactively classify crop types in those images. The ability to retroactively classify historical images may facilitate determination of various trends (e.g., in cropland use, crop yields, etc.).

Figure 6:
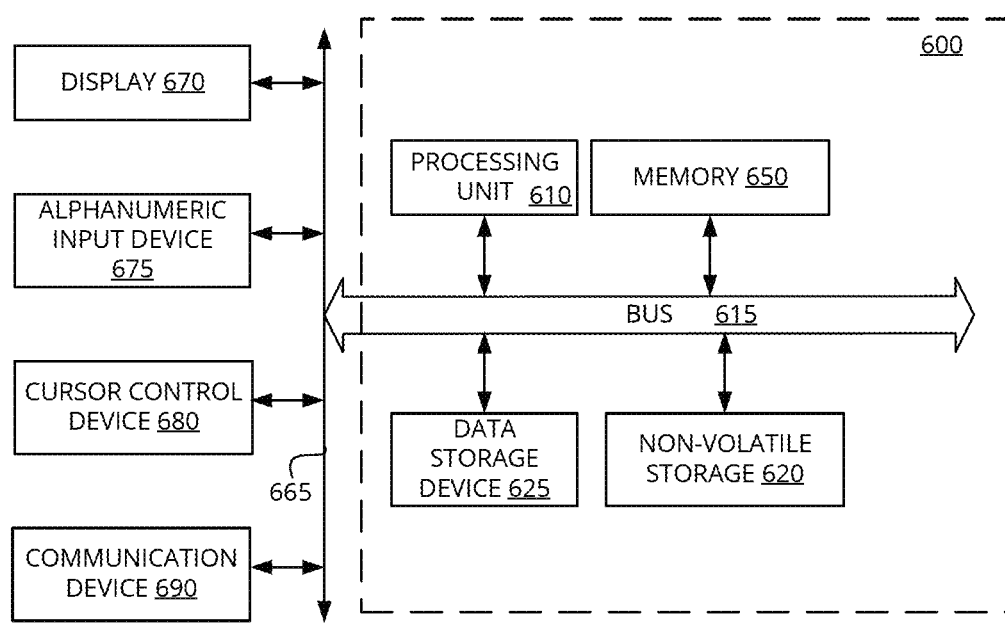
FIG. 6 depicts an example device that may be implemented in the system of FIG. 1 of the present disclosure, according to some embodiments.

FIG. 6 depicts an example device that may be implemented in the system 100 of the present disclosure, according to some embodiments. The device of FIG. 6 may comprise at least a portion of any of server 104, database 106, server 108, database 110, device 112, and/or device 116. Platform 600 as illustrated includes bus or other internal communication means 615 for communicating information, and processor 610 coupled to bus 615 for processing information. The platform further comprises random access memory (RAM) or other volatile storage device 650 (alternatively referred to herein as main memory), coupled to bus 615 for storing information and instructions to be executed by processor 610. Main memory 650 also may be used for storing temporary variables or other intermediate information during execution of instructions by processor 610. Platform 600 also comprises read only memory (ROM) and/or static storage device 620 coupled to bus 615 for storing static information and instructions for processor 610, and data storage device 625 such as a magnetic disk, optical disk and its corresponding disk drive, or a portable storage device (e.g., a universal serial bus (USB) flash drive, a Secure Digital (SD) card). Data storage device 625 is coupled to bus 615 for storing information and instructions.

Platform 600 may further be coupled to display device 670, such as a cathode ray tube (CRT) or a liquid crystal display (LCD) coupled to bus 615 through bus 665 for displaying information to a computer user. In embodiments where platform 600 provides computing ability and connectivity to a created and installed display device, display device 670 may display the images overlaid with the crop fields/sub-fields information as described above. Alphanumeric input device 675, including alphanumeric and other keys, may also be coupled to bus 615 through bus 665 (e.g., via infrared (IR) or radio frequency (RF) signals) for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670. In embodiments utilizing a touch-screen interface, it is understood that display 670, input device 675, and cursor control device 680 may all be integrated into a touch-screen unit.

Another component, which may optionally be coupled to platform 600, is a communication device 690 for accessing other nodes of a distributed system via a network. Communication device 690 may include any of a number of commercially available networking peripheral devices such as those used for coupling to an Ethernet, token ring, Internet, or wide area network. Communication device 690 may further be a null-modem connection, or any other mechanism that provides connectivity between platform 600 and the outside world. Note that any or all of the components of this system illustrated in FIG. 6 and associated hardware may be used in various embodiments of the disclosure.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit (ASIC) or otherwise.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
obtaining a plurality of image sets associated with a geographical region and a time period, wherein each image set of the plurality of image sets comprises multi-spectral and time series images that depict a respective particular portion of the geographical region during the time period;
predicting one or more crop types growing in each of particular locations within the particular portion of the geographical region associated with an image set of the plurality of image sets;
determining a crop type classification for each of the particular locations based on the predicted one or more crop types for the respective particular locations; and
generating a crop indicative image comprising at least one image of the multi-spectral and time series images of the image set overlaid with indications of the crop type classification determined for the respective particular locations;
wherein determining the crop type classification for each of the particular locations comprises:
in response to determining that the crop types predicted for the respective particular location include a dominant majority predicted crop type, selecting the dominant majority predicted crop type as the crop type classification; and
in response to determining that the crop types predicted for the respective particular location does not include a dominant majority predicted crop type:
splitting the respective particular location into a plurality of sub-particular locations; and
classifying each respective sub-particular location as a respective crop type of the crop types predicted for the particular location.

2. The method of claim 1, wherein predicting the one or more crop types growing in each of the particular locations comprises:
  predicting presence of a crop at the particular locations;
  determining crop boundary locations within the particular portion of the geographical region based on the predicted presence of the crop at the particular locations; and
  predicting the one or more crop types growing within each of the determined crop boundary locations.

3. The method of claim 1, further comprising estimating a crop yield for each of the particular locations based on the crop type classification determined for the respective particular locations.

4. The method of claim 1, further comprising determining crop management practices for each of the particular locations based on the crop type classification determined for the respective particular locations.

5. The method of claim 1, wherein determining the crop type classification for each of the particular locations comprises determining the crop type classification to a sub-meter ground resolution for each of the particular locations.

6. The method of claim 1, wherein predicting the one or more crop types growing in each of the particular locations comprises applying the image set to one or more machine learning systems or a convolutional neural network (CNN).

7. The method of claim 6, wherein the one or more machine learning systems or CNN is configured to predict the one or more crop types growing in each of the particular locations after supervised training on ground truth data.

8. The method of claim 7, wherein the ground truth data comprises one or more of government crop data, publicly available crop data, images with crop areas identified at low ground resolution, images with crop types identified at low ground resolution, images with manually identified crop boundaries, images with manually identified crop boundaries and crop types, crop survey data, sampled crop data, and farmer reports.

9. The method of claim 1, wherein predicting the one or more crop types growing in each of the particular locations comprises, for each of the particular locations, analyzing the time series images for changes over time of pixels associated with the respective particular locations, wherein a particular change pattern of the pixels is associated with at least one crop type.

10. The method of claim 1, further comprising:
  causing to display the crop indicative image on a device accessible by a user; and
  receiving a modification, from the user, of a particular indication from among the indications of the crop type classification determined for the respective particular locations, wherein the modification comprises a manual re-classification of the crop type for the particular location associated with the particular indication.

11. One or more non-transitory computer-readable storage media comprising a plurality of instructions to cause an apparatus, in response to execution by one or more processors of the apparatus, to:
  obtain a plurality of image sets associated with a geographical region and a time period, wherein each image set of the plurality of image sets comprises multi-spectral and time series images that depict a respective particular portion of the geographical region during the time period;
  predict one or more crop types growing in each of particular locations within the particular portion of the geographical region associated with an image set of the plurality of image sets;
  determine a crop type classification for each of the particular locations based on the predicted one or more crop types for the respective particular locations; and
  generate a crop indicative image comprising at least one image of the multi-spectral and time series images of the image set overlaid with indications of the crop type classification determined for the respective particular locations;
  wherein to predict the one or more crop types growing in each of the particular locations comprises to apply the image set to one or more machine learning systems, wherein the one or more machine learning systems include a convolutional neural network (CNN); and
  wherein the one or more machine learning systems are configured to predict the one or more crop types rowing in each of the particular locations after supervised training on ground truth data.

12. The computer-readable storage medium of claim 11, wherein to predict the one or more crop types growing in each of the particular locations comprises to:
  predict presence of a crop at the particular locations;
  determine crop boundary locations within the particular portion of the geographical region based on the predicted presence of the crop at the particular locations; and
  predict the one or more crop types growing within each of the determined crop boundary locations.

13. The computer-readable storage medium of claim 11, wherein to determine the crop type classification for each of the particular locations comprises, for each of the particular locations, to select a dominant majority predicted crop type from among the crop types predicted for the respective particular locations, wherein the dominant majority predicted crop type is the crop type classification.

14. The computer-readable storage medium of claim 11, wherein to determine the crop type classification for each of the particular locations comprises:
  for each of the particular locations, if the dominant majority predicted crop type is absent, to split the respective particular location into a plurality of sub-particular locations and classify each of the respective sub-particular locations of the plurality of sub-particular locations as a respective crop type of the crop types predicted for the particular location.

15. The computer-readable storage medium of claim 11, wherein to determine the crop type classification for each of the particular locations comprises to determine the crop type classification to a sub-meter ground resolution for each of the particular locations.

16. The computer-readable storage medium of claim 11, wherein the ground truth data comprises one or more of government crop data, publicly available crop data, images with crop areas identified at low ground resolution, images with crop types identified at low ground resolution, images with manually identified crop boundaries, images with manually identified crop boundaries and crop types, crop survey data, sampled crop data, and farmer reports.

17. The computer-readable storage medium of claim 11, wherein a first resolution of a first image of the image set is different from a second resolution of a second image of the image set, the first resolution is lower than a third resolution of the crop indicative image, and a fourth resolution of at least a portion of the ground truth data is lower than the third resolution of the crop indicative image.

18. The computer-readable storage medium of claim 11, wherein to predict the one or more crop types growing in each of the particular locations comprises, for each of the particular locations, to analyze the time series images for changes over time of pixels associated with the respective particular locations, wherein a particular change pattern of the pixels is associated with at least one crop type.

19. A method comprising:
obtaining a plurality of image sets associated with a geographical region and a time period, wherein each image set of the plurality of image sets comprises multi-spectral and time series images that depict a respective particular portion of the geographical region during the time period;
predicting one or more crop types growing in each of particular locations within the particular portion of the geographical region associated with an image set of the plurality of image sets;
determining a crop type classification for each of the particular locations based on the predicted one or more crop types for the respective particular locations; and
generating a crop indicative image comprising at least one image of the multi-spectral and time series images of the image set overlaid with indications of the crop type classification determined for the respective particular locations;
wherein predicting the one or more crop types growing in each of the particular locations comprises applying the image set to one or more machine learning systems that include a convolutional neural network (CNN); and
wherein the one or more machine learning systems are configured to predict the one or more crop types growing in each of the particular locations after supervised training on ground truth data.

20. The method of claim 19, further comprising estimating a crop yield for each of the particular locations based on the crop type classification determined for the respective particular locations.

21. The method of claim 19, further comprising determining crop management practices for each of the particular locations based on the crop type classification determined for the respective particular locations.

22. The method of claim 19, wherein determining the crop type classification for each of the particular locations comprises determining the crop type classification to a sub-meter ground resolution for each of the particular locations.

\* \* \* \* \*